Sept. 2, 1969  L. E. KILMARX  3,464,309
BRIDGE WASHER
Filed Oct. 2, 1967

INVENTOR
LOUIS E. KILMARX
BY Dallett Hoopes

United States Patent Office 3,464,309
Patented Sept. 2, 1969

3,464,309
BRIDGE WASHER
Louis E. Kilmarx, Dickson, Tenn., assignor to Scovill Manufacturing Company, Waterbury, Conn., a corporation of Connecticut
Filed Oct. 2, 1967, Ser. No. 672,371
Int. Cl. F16b 17/00, 43/00; B60c 23/10
U.S. Cl. 85—36            2 Claims

ABSTRACT OF THE DISCLOSURE

A one-piece self-holding bridge washer for valves of tube-type tires is made of sheet metal with spring tongues having gripping edges adapted to lock into the threads in the outside of the stem when pushed in place over the valve stem.

It is made dish-shaped so that arching wall portions between the bearing points reinforce the structure against bending stresses to provide the necessary strength even though the metal may be sufficiently thin to give the desired flexibility to the spring tongues.

---

This invention relates to bridge washers applied to valve stems of tube-type tires such as are widely used on trucks. These washers are commonly formed as an elongated piece of heavy sheet steel and are held in place on the valve stem by a brass nut.

This invention combines the functions of the washer and nut in one-piece for the sake of economy of manufacture and ease of assembly on the valve stem. The washer is formed with spring tongues which may be engaged over the threaded portion of a valve stem by simply pushing the washer into place, and thus be self-holding without the usual threaded nut. The resulting assembly will prevent the tube from pushing into the rim opening, which is usually a slot in the case of truck rims, and will maintain the alignment and mounting position of the stem.

The washer is made out of comparatively thin sheet metal so that the tongues which grip the stem will have sufficient flexibility and it is made strong enough by side walls which connect the sloping end walls with the inner part that bears against the tube.

A further object of the invention is to provide means to position a washer to prevent sticking of adjacent washers when they are stacked or nested together.

Figure 1:
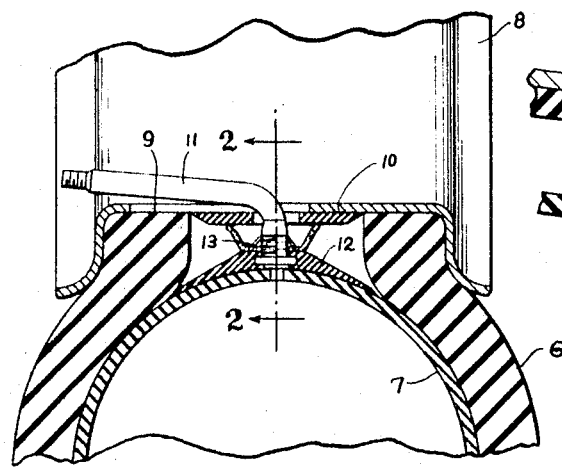
Figure 2:
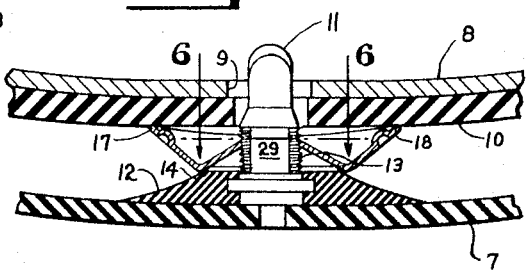
Figure 3:
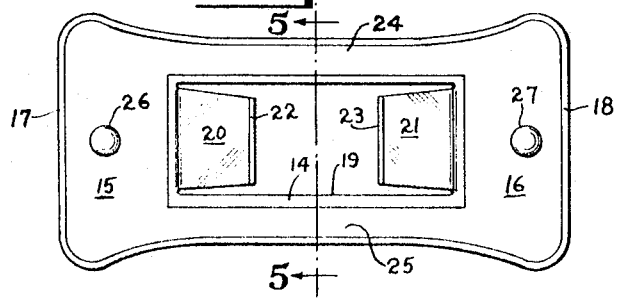
Figure 5:
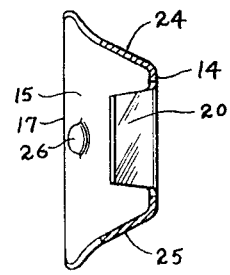
Figure 4:
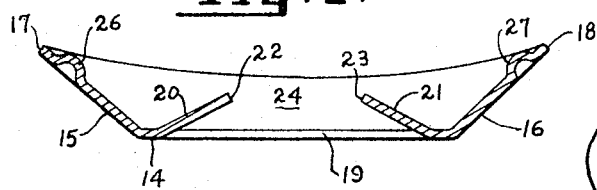
Figure 6:
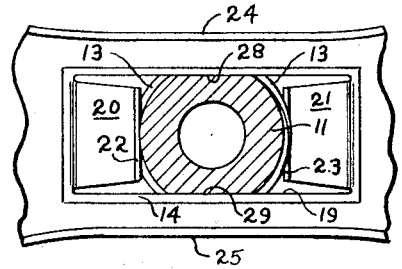

In the accompanying drawings I have illustrated one embodiment which the invention may assume in practice. In these drawings:

FIGURE 1 is a cross section of a portion of a truck tire and rim equipped with the bridge washer;
FIGURE 2 is a partial central section at right angles to FIGURE 1 along line 2—2;
FIGURE 3 is a plan view of the bridge washer;
FIGURE 4 is a longitudinal central section;
FIGURE 5 is a transverse cross section taken centrally of the washer as seen at 5—5 in FIGURE 3; and
FIGURE 6 is a cross section on line 6—6 of FIGURE 2.

The truck tire is indicated by the numeral 6, the inner tube 7, and the metal rim 8. The rim has a crosswise extending slot 9, and there is preferably installed between the tube and rim, a liner or flap 10. The valve stem 11, has the usual rubber base 12, secured to the inner tube in any known manner, and the valve stem has a threaded section 13 near the base 12.

The bridge washer is formed from one piece of sheet metal into a dished shape, preferably resembling an elongated cup. It may be described as having an inner wall or bearing portion 14, to rest against the rubber base 12, which base may be considered as an integral part of the inner tube 7. Walls 15 and 16 extend angularly upwardly so that their edges 17 and 18 bear against the rim or the liner 10, in the same manner as the ends of the usual heavy steel washer. The inner portion 14, has a rather large rectangular opening 19, and from the ends of this opening extend the spring tongues 20 and 21. They are made so as to extend inward of the opening 19 at an angle upwardly and are sufficiently flexible so that the washer may be pushed in place with the opposite edges 22 and 23 of the spring tongues riding over the threaded section 13 and locking the washer in place.

Strength is imparted to the washer against bending by means of continuous arc shaped side walls 24 and 25. These side walls form an integral connection between the inner portion 14 and the end walls 15 and 16, such side walls throughout their vertical extent being integrally joined to said end walls. The outline of the free edges of the reinforcing walls 24 and 25 between the end walls 17 and 18 may be described as being inwardly bowed to accommodate the rim curvature, such side walls throughout their vertical extent being integrally joined to side end walls.

In order to prevent the parts sticking together when a number of them are nested for easier handling, end walls 15 and 16, may be provided with inward projections or dimples 26 and 27.

The side edges of the rectangular opening 19 cooperate with the flats 28 and 29 on the valve stem to position the washer on the stem.

As a result of my invention it will be evident that I have provided a one-piece self-locking bridge washer which is economical to manufacture and which can be easily assembled on a tire valve stem without requiring a threaded nut.

What I claim is:
1. A one-piece self-holding bridge washer made of sheet metal and adapted to span a valve-stem-receiving opening in a rim to maintain alignment of the valve stem and to hold a tire tube away from such opening, which comprises:
   (a) an inner portion adapted to bear against the tube and having an opening therethrough;
   (b) end walls adapted to bear against an inner surface of said rim or against a liner inside the rim;
   (c) reinforcing side walls integral with said inner portion and said end walls; and
   (d) inward spring tongues angled upwardly from the edges of said opening, said tongues having opposed valve stem gripping edges, whereby said washer may be pushed into place on a valve stem and be firmly held by said gripping edges, wherein said end walls extend angularly upwardly and outwardly from said inner portion and wherein said reinforcing walls extend completely along the sides of the washer and are integrally joined to said end walls throughout the vertical extent of said reinforcing walls, so that the result is a generally rectangular cup shape with the spring tongues extending into the hollow space of the cup; the outline of the free edges of said reinforcing walls between said end walls being inwardly bowed to accommodate the rim curvature, the outward extent of said end walls from said inner portion being substantially greater than of said spring tongues.

2. A bridge washer as defined in claim 1 wherein said end walls have inwardly formed projections to allow nesting of a plurality of washers without sticking together.

References Cited

UNITED STATES PATENTS

| | | | |
|---|---|---|---|
| 598,125 | 2/1898 | Welch | 152—429 |
| 1,225,420 | 5/1917 | Eggert | 85—36 |
| 1,245,110 | 10/1917 | Kraft | 152—429 |
| 1,966,428 | 7/1934 | Brown | 152—429 |
| 2,778,374 | 1/1957 | Boyer | 152—429 |

FOREIGN PATENTS

| | | |
|---|---|---|
| 175,598 | 7/1953 | Austria. |
| 510,914 | 3/1955 | Canada. |
| 478,782 | 1/1938 | Great Britain. |
| 527,279 | 10/1940 | Great Britain. |
| 821,706 | 10/1959 | Great Britain. |

MARION PARSONS, Jr., Primary Examiner

U.S. Cl. X.R.

85—50; 152—429